United States Patent [19]

Szirmay

[11] Patent Number: 4,529,415
[45] Date of Patent: Jul. 16, 1985

[54] GASEOUS SEPARATION APPARATUS AND PROCESS

[76] Inventor: Leslie Szirmay, 948 Winona Dr., Youngstown, Ohio 44511

[21] Appl. No.: 618,425

[22] Filed: Jun. 7, 1984

Related U.S. Application Data

[63] Continuation-in-part of Ser. No. 415,037, Sep. 7, 1982, abandoned.

[51] Int. Cl.³ .............................................. B01D 53/04
[52] U.S. Cl. ........................................ 55/62; 55/68; 55/74; 585/821; 585/827
[58] Field of Search ................... 55/18, 20, 21, 25, 26, 55/59, 62, 68, 74, 75, 179, 387, 389; 585/821, 825, 826, 827, 831, 828

[56] References Cited

U.S. PATENT DOCUMENTS

| | | | |
|---|---|---|---|
| 1,422,007 | 7/1922 | Soddy | 55/79 |
| 1,422,008 | 7/1922 | Soddy | 55/79 |
| 2,529,289 | 11/1950 | Gilliland | 55/79 |
| 2,548,502 | 4/1951 | Small | 55/79 |
| 2,666,500 | 1/1954 | Cahn et al. | 55/79 |
| 2,684,729 | 7/1954 | Berg | 55/79 |
| 2,966,531 | 12/1960 | Louis | 585/821 |
| 2,978,407 | 4/1961 | Tuttle et al. | 585/828 X |
| 2,985,589 | 5/1961 | Broughton et al. | 585/825 X |
| 3,206,521 | 9/1965 | Long | 585/821 X |
| 3,223,748 | 12/1965 | Bohrer | 585/825 |
| 3,370,002 | 2/1968 | Cottle | 585/821 X |
| 3,409,544 | 11/1968 | Cottle | 585/825 X |
| 3,442,066 | 5/1969 | Spangler, Jr. et al. | 55/390 |
| 3,476,822 | 11/1969 | Robertson et al. | 585/821 |
| 3,539,502 | 11/1970 | Griswold | 585/826 X |
| 3,689,404 | 9/1972 | Hofer et al. | 585/825 X |
| 3,700,589 | 10/1972 | Symoniak et al. | 585/826 X |
| 3,727,376 | 4/1973 | Szirmay | 55/60 |
| 3,770,621 | 11/1973 | Collins et al. | 585/825 X |
| 4,176,053 | 11/1979 | Holcombe | 585/825 X |
| 4,197,095 | 4/1980 | White, Jr. et al. | 55/21 X |

FOREIGN PATENT DOCUMENTS

597305   5/1960   Canada .............................. 585/826

OTHER PUBLICATIONS

Mass Transfer; Sherwood, T. K., Pigford, R. L., Wilke, C. R., 1975.
Mass-Transfer Operations; Treybal, R. E.
Separation Processes; King, J. C., p. 648.
Dynamic Behaviour & Relative Mass Transfer Coefficients of a Porous Absorbent Through Exchange Absorption, Szirmay, L. V., Trans I, Chem. E., vol. 56, 1978.
Process for Gas Separation on a Moving Absorbent Bed, Szirmay, L. V., AICH E, vol. 71, No. 152.

Primary Examiner—Robert Spitzer
Attorney, Agent, or Firm—Harpman & Harpman

[57] ABSTRACT

A method and apparatus for the semi-continuous batch separation of a feed mixture of gaseous products into individual substantially pure products utilizes preferential adsorption in which all the components of a gaseous feed mixture are adsorbed by one or more adsorbers through which the feed mixture of gaseous products are sequentially cycled through the steps of (1) progressive adsorption of adsorbates from the mixture of gaseous products; (2) rectification of the adsorbates and (3) desorption of adsorbates contained in the adsorber with the adsorber being readied for further adsorption. Substantially pure gases are collected at appropriate intervals throughout the sequential cycling.

5 Claims, 7 Drawing Figures

GASEOUS SEPARATION APPARATUS AND PROCESS

This is a continuation in part of Ser. No. 415,037, filed Sept. 7, 1982, now abandoned.

FIELD OF THE INVENTION

This invention relates to the separation of gaseous products from a mixture of the same by utilizing the tendency of some gaseous products to be more readily adsorbed upon an adsorbent than others.

BACKGROUND OF THE INVENTION

Adsorption may be attributed to several factors acting separately or simultaneously. With respect to the adsorbent, one can distinguish between physical and chemical adsorption, and with respect to the adsorbate distinction can be made between polar and non-polar adsorption. The most important force resulting in physical adsorption is called the dispersion force, resulting in attraction between two atoms because of the distortion of the electron density in one atom, which induces a corresponding electrical moment in the atoms of the neighborhood. In chemisorption, a chemical compound is formed between adsorbent and adsorbate, and in contrast to physical adsorption, electron transfer always occurs.

It was found by Lewis et al Ind Eng. Chem. 42, 1319 (1950) that for ideal mixed adsorption, relative adsorbabilities behave like relative volatilities. In cases when relative adsorbabilities approach unity, the relationship between the gas phase and the adsorbed phase concentrations approach linearity, as it is the case for the simultaneous adsorption of ethane and ethylene on activated carbon. The term quasilinear used hereinafter means that the isotherm of one component under no circumstances would cross the isotherm of the other component. Referring here to distillation, a gas mixture which cannot be characterized by linear or quasilinear isotherms would be similar to an azeotrope mixture.

Gas separation is a major problem in the chemical industry. Separation of gases may be accomplished by fractional distillation, solvent extraction, selective adsorption and similar processes. For example, ethylene purities up to 99.9 percent are being produced by low temperature distillation. Usually 50–90 plates and reflux ratios of 4–6 are required depending on the composition of the feed. It was shown by Szirmay, Trans.IchemE., 56, 101(1978), that a similar separation could be achieved in one adsorption column of barely more than one foot in length. Said reference further led to the realization of the possibility of completely separating in one operation a group of the most adsorbing components of a gas mixture, provided this gas mixture is characterized by linear or quasilinear properties. To achieve this effect a component (or components), with the highest adsorbability of said gas mixture, can be used as an agent to cause rectification, such that from said group of the most adsorbing components, the component with the lowest adsorbability can be collected first, in fair purity, next the component with the next higher adsorbability can be collected in fair purity, similarly the remaining components of said group can be collected in fair purities in the order of increasing adsorbabilities, finally the highest adsorbing component (or components) of said group, designated before as rectifying agent, can be collected in high purity. This operation will become more apparent as the specification proceeds.

My prior U.S. Pat. No. 3,727,376 discloses a moving adsorbent bed process.

The present invention provides a new preferential adsorption method and apparatus for separating gaseous mixtures of materials characterized by linear or quasilinear adsorption isotherms.

Another object of the invention is to provide a relatively inexpensive method and apparatus for use in separating specific gases from a feed mixture of gases and separating a specific gas such as ethane from ethylene.

Another object of the invention is to provide rectification effect by using a desired bottom product as rectifying agent.

SUMMARY OF THE INVENTION

The present invention provides a method and apparatus for separation in a fixed bed adsorber of a mixture of cominged gases. An apparatus for the practice of the instant invention comprises an adsorber vessel having feed and withdrawal ends and an adsorbent charged into the adsorber vessel in a fixed configuration, the adsorbent remaining substantially motionless within the adsorber vessel during operation. The adsorber apparatus includes means by which a feed stream of a mixture of gases may be introduced at a controllable rate into the adsorber adjacent the feed end of the adsorber vessel. A first means for withdrawing and analyzing gases leaving the adsorber is provided for those gases not adsorbed during passage through the adsorber.

The adsorber apparatus also includes a second and separate means for introducing a rectifying gas in substantially pure form into the feed region of the adsorber at a controllable flow rate. Also included is a corresponding, second separate means for withdrawing and analyzing gases effluenting the adsorber during introduction of the rectifying gas. Also included is a means for segregating gases withdrawn by the second means into at least one, and as many as $n-1$ discrete batches (where n is the number of cominged gaseous products).

The adsorber apparatus further includes a third and separate means for introducing a desorbent into the adsorber during controllable periods together with third, separate means for withdrawing and analyzing gases from the adsorber while the desorbent is being introduced.

In certain preferred embodiments a fourth separate means is included for readying the adsorber for further adsorption.

Generally, the introduction and withdrawal means include piping and valving for controllably effecting flow of the various materials into and out of the adsorber.

In operation, a most adsorbable, least adsorbable and intermediately adsorbable gaseous products are separated from a mixture of n gaseous products using the adsorber apparatus and method. Initially, the mixture of gases are conveyed through the first introduction means into the adsorber. Least adsorbed gases are withdrawn from the adsorber using the first withdrawal means until a significant quantity of a particular more adsorbable gaseous product appears in the adsorber effluent, an event termed the onset of breakthrough. The flow of the mixture of gaseous products into the adsorber is then discontinued at some point during or immediately following breakthrough.

A rectifying gas or agent is then introduced into the feed end of the adsorber using the second introduction means, and gaseous products withdrawn from the adsorber until the most adsorbable gaseous product appears in the effluent from the adsorber in a desired significant quantity whereupon flow of the rectifying agent is discontinued. The rectifying agent can be the gas in the feed mixture having the highest adsorbability in the adsorbent used.

Using the third introduction means, the adsorber is then desorbed and the effluent from the adsorber which is the rectifying agent is collected by a third withdrawal means. Following desorption, the adsorber is readied for adsorption, repeating the steps of the process.

During rectification, the gases effluenting the adsorber optimally can be segregated into at least one and as many as $n-1$ gaseous products.

In preferred embodiments, at least three of the adsorbers are arranged for parallel operation such that one is adsorbing the mixture of product gases while another is being rectified while still another is being desorbed and readied for further adsorption. In certain preferred embodiments, a fourth adsorber is utilized, one adsorber being desorbed while another is readied for further adsorption.

Where three or more adsorbers are utilized, the first, second, third, and where appropriate, readying means of each adsorber are respectively arranged with corresponding means of the remaining adsorbers to utilize common headers or supply piping. The corresponding withdrawal means are likewise arranged with headers and to utilize respectively, a single analyzer means for each header.

Where more than one adsorber is utilized, a control means is necessary to cycle the adsorbers through adsorption, rectification, desorption, readying and back to the adsorption operating mode. For adsorbers controllably cycled through these operating modes, one after another, a fairly continuous set of product gas streams may be withdrawn from the adsorbers while feeding a fairly continuous feed mixture to the adsorber, creating a semi-continuous batch preferential adsorption system.

The above and other features and advantages of the adsorption apparatus and method of the instant invention will become more apparent when considered with a description of the preferred embodiment of the invention and with illustrative drawings together forming a part of the specification as follows:

DESCRIPTION OF THE PREFERRED EMBODIMENT

Figure 1:
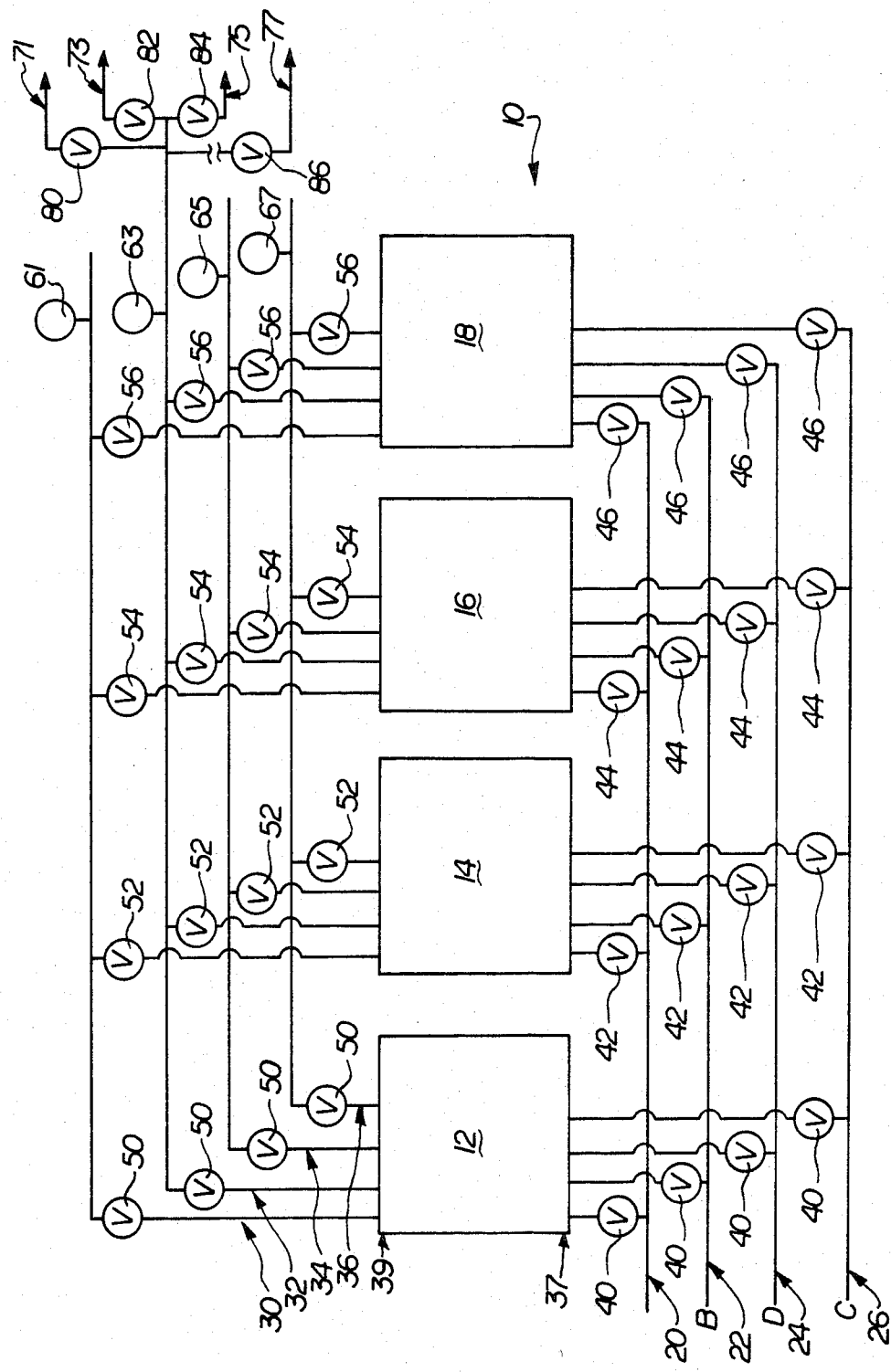
FIG. 1 is a schematic flow chart representation of adsorbers arranged in accordance with the present invention.

The present invention provides in preferred embodiments an apparatus for semi-continuous batch separation of a mixture of product gases into at least one less adsorbable, and at least one more adsorbable, gaseous product stream. Referring to the drawings, FIG. 1 shows an adsorber system 10 suitable for the practice of the method of the invention.

The system 10 includes adsorber vessels 12, 14, 16 and 18 in which adsorbents are located. Gaseous materials are fed to the adsorber vessels by way of entry headers 20, 22, 24, and 26. Gaseous materials are withdrawn from the adsorber vessels by effluent headers 30, 32, 34, and 36.

The adsorber vessels 12, 14, 16 and 18 as used in the invention can be of any suitable or conventional configuration such as are well known in vapor phase adsorption unit operations. Typically, an adsorber vessel includes a metal shell of steel or other suitable or conventional metal or alloy or a resinous shell of a suitable or conventional plastic, an adsorbent is positioned within each shell.

The adsorber vessels can be configured for passage of gas in either vertical or horizontal flow. Choice of flow configuration can be influenced by a variety of factors that often focus upon depth (height) to which the adsorbent can be arranged in close packed order within the adsorber vessels, and the pressure drop of gases flowing through the closely packed adsorbent. In FIG. 1, the adsorber vessels are configured for vertical flow. Each adsorber vessel includes a feed end 37 and a withdrawl or effluent end 39.

The adsorbent charged to the adsorbers can be any suitable or conventional material generally typified by having a substantial surface area to physical mass ratio, typically an activated carbon. In the preferred embodiment, the adsorbent is BPL activated carbon available from PPG Industries.

The adsorbent is charged to the adsorber in well known manner, internal adsorbent supports being supplied within an adsorber vessel as required to preclude crushing of adsorbent. The adsorbent is arranged to insure the relatively free passage of gases through the adsorbent. In implementing the process of the instant invention, the pressure drop associated with gas flow through the adsorbent should be within limits conventionally accepted in gas adsorption operations.

The charge of adsorbent, as arranged in the adsorber, is frequently referred to as an adsorption bed. In implementing the instant invention, it is important that the adsorbent bed remain substantially stationary within the adsorber. Particularly, it is important that substantially no backmixing of adsorbates within the adsorber occur, as backmixing can contribute to a blurring of separations of various gases being desorbed from adsorbent within the adsorber. Such adsorbers having the adsorbate substantially immobile as charged, are sometimes known as fixed bed adsorbers.

The adsorbers are frequently equipped with a variety of fittings, nipples, and the like for sampling gases passing through the adsorber, charging adsorbent, gaining access to the adsorber, making measurements of variables such as temperature and pressure and the like.

Additionally, for some preferred embodiments of the invention it is desirable that a tube or panel be provided within the adsorber for the non-contacting introduction of hot or cold fluids for altering and/or controlling the temperature of adsorbent within the adsorber.

The adsorber is also provided with at least one pair of fittings such as nipples or flanged nipples by which gases may be introduced into the adsorber and withdrawn. Generally each nipple is positioned on opposite ends of the adsorber. These fittings may be arranged using T's or the like to accept gases from one or more of the entry headers 20, 22 24, and 26 or to discharge gases into one or more of the headers 30, 32, 34, and 36. While the headers may join for adsorber entry or effluent, equally each may enter or effluent the adsorber separately through a private fitting.

Each entry header 20, 22, 24, 26 is equipped with a flow control means such as a valve 40, 42, 44, 46, while each effluent header 30, 32, 34, 36 is equipped with a flow control means such as valve 50, 52, 54, 56, by which gases may be introduced into one of the adsorbers 12, 14, 16, 18 while simultaneously being withdrawn from the adsorber after passing through the adsorbent.

The valves are generally opened or closed pursuant to instructions from a control means (not shown) such as a batch sequencer or computer, but may equally be activated by an operator responsible for control of the process. Generally, corresponding entry and effluent valves upon a single adsorber will be opened and closed approximately together. So, for example, valves 40 and 50 would open and close together, valves 44 and 54 together, and 46 and 56 together, and valves 42 and 52 together.

Each effluent header 30, 32, 34, 36 includes a means 61, 63, 65, 67 for analyzing effluent gases for composition. The nature of the analyzer means may vary with the nature of gases being adsorbed, but may include any suitable or conventional analyzer such as a chromatograph, ultraviolet analyzer, infrared analyzer or the like. Where a control means is employed for opening and closing the valves, the analyzer means should be arranged to communicate compositions to the control means using well known control technology techniques.

One effluent header, 32, is arranged to segregate effluenting gases into one or more separate product headers, 71, 73, 75, 77. Access to these product headers is controlled by valves 80, 82, 84, 86 which may be controlled in a manner in accordance with the other valving. The number of product headers can be limited only by the number n of product gases being separated, the number of product headers being generally n−1.

In operation, each adsorber is staged through a four part adsorption cycle wherein: a feed gas is introduced into the adsorber; followed by introduction of a rectifying agent into the adsorber; followed by desorption of the adsorbent; followed by the adsorbent being readied for further adsorption.

A cycle is begun, for example on adsorber 12, by opening valves 40 and 50. A mixture of n product gases for separation by adsorption is provided via entry header 20 and enters the adsorber 12 through valve 40. The mixture of gases passes through the adsorber 12, exiting the adsorber 12 via valve 50 into effluent header 30. Analyzer 61 is utilized to ascertain the composition of gases exiting the adsorber 12 in the effluent header 30.

The mixture of product gases passing through the adsorber includes some more readily retained upon the adsorbent therein than others. Generally, the gases will range from a least adsorbent to a most adsorbent.

In passage through the adsorbent within the adsorber, the more adsorbable product gases adsorb upon the adsorbent. Initially, substantially only the least adsorbable gas in the mixture of product gases effluents the adsorber into header 30. This least adsorbable gas can be collected as a substantially pure least adsorbable product gas. As more adsorbable gases accumulate upon the adsorbent, eventually the next most adsorbable gas commences effluenting the adsorber in substantial quantity, a breakthrough event. Substantial quantity means a concentation of the next most adsorbable gas in the gas stream effluenting the adsorber in excess of a desired level. This breakthrough can be ascertained using the analyzer 61.

Following breakthrough of this next most adsorbable product gas, any collection of the substantially pure least adsorbable gas is discontinued. Gases then exiting the adsorber can then generally be collected for recycle as feed gas to a subsequent adsorption cycle. Following breakthrough of a more adsorbable gas, introduction of the mixture of product gases to the adsorber is continued until the most adsorbable gas breaks through. The valves 40 & 50 are then closed, and flow of the mixture of product gases through the adsorber is thereby discontinued. Typically, flow of the feed gases is continued until breakthrough of the most adsorbable product gas is complete and the composition of gases effluenting the adsorber approximates the composition of the feed gas mixture. Thus the adsorption capacity of the adsorbent is generally more fully utilized.

Following breakthrough of the most adsorbable component of the feed mixture of product gases, the adsorber is rectified. Rectification is accomplished by introduction into the feed end 37 of the adsorber of a rectifying agent. This rectifying agent is generally at least as adsorbable upon the adsorbent as the most adsorbable gas in the mixture of product gases adsorbed upon the adsorbent. In this preferred embodiment, the rectifying agent is the most adsorbable gas contained in the mixture of product gases adsorbed upon the adsorbent. It is desirable that this rectifying agent contain substantially no lesser adsorbed constituents to provide desirably effective rectification of the adsorbent.

Rectification is accomplished upon the adsorbent in adsorber 12 by opening valves 40, 50. The rectifying agent, provided in entry header 22, then flows into the adsorber 12 adjacent the feed end 37. This rectifiying agent displaces lesser adsorbed gases from the adsorbent, causing these lesser adsorbed gases to exit the adsorber 12 into effluent header 32, from which they may be recovered. The composition of exiting gases can be ascertained using the analyzer 63. Composition of gas exiting the adsorber will vary depending upon the quantity of rectification agent having been introduced into the adsorber at any particular time.

That the composition of gas exiting the adsorber will vary is at least partially attributable to a certain stratification of gases adsorbed upon the adsorbent during rectification. Within the adsorber 12, the most adsorbable gas will tend to be concentrated upon the adsorbent near the feed end 37 of the adsorber 12. During rectification the lesser adsorbable gas will tend to stratify in layers of the adsorbent nearer the withdrawal end 39 and the more adsorbable gases nearer the feed end 37. So long as the gases are at least quasilinear, the zones will tend to contain progressively less adsorbable gases when viewed from the feed end 37 to the withdrawal end 39. Between each stratified zone of a gas adsorbed upon the adsorbent is an area where gases from the adjacent zones tend to be intermixed upon the adsorbent.

As rectification agent is introduced at the feed end of the adsorber 12, lesser adsorbed gases are displaced, moving towards the withdrawal end 39 until a still lesser adsorbed gas is encountered upon the adsorbent. That still lesser adsorbed gas is then displaced and moves towards the withdrawal end 39 until encountering an even lesser adsorbed gas, and so forth. In this manner, as rectification agent enters the stratified zones of gases in the adsorber 12 and intermingled areas between zones being to form and proceed in wave-like fashion towards the withdrawal end 39.

With continued introduction of rectifying agent, these stratified zones tend to exit the adsorber as pulses of relatively pure product gas, in order from lesser adsorbable to more adsorbable. These pulses of relatively pure product gases can be identified using the analyzer 63 and can be isolated or segregated using product headers 71, 73, 75, 77 by the selective opening of valves 80, 82, 84, 86. The analyzers in consort with the control means can be utilized to activate these product headers by intercommunication.

As intermixed gas flows from the adsorber between pulses of relatively pure product gases, these intermixed flows can be collected and recycled for separation during a subsequent adsorption cycle. The relative quantity of the gases effluenting in these intermixed zones is in general dependent upon the relative adsorbability of the neighboring components concerned. The greater the relative adsorbability, the narrower the intermixed zone.

Eventually, the rectification agent will commence effluenting the adsorber. Where this rectifying agent has been the most adsorbable product gas, then, where desirable, as many as n−1 products will have been collectable using the product headers 71, 73, 75 and 77, as many product headers being available as generally are required effectively to isolate the n−1 gases. As breakthrough of the rectification agent is identified, the flow of the agent is arrested by the closing of valves 40, 50, thus concluding the rectification step. Typically, arresting of the flow of rectification gas to the adsorber is delayed until substantially pure rectification agent is effluenting the adsorber, that is, until breakthrough of the rectification is substantially complete. This delay can facilitate recovery of substantially pure rectification agent from the adsorbent in the adsorber.

Figure 2:
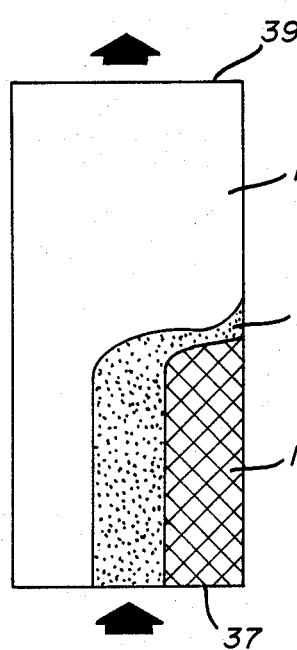
FIG. 2 is a diagrammatic view of an advancing breakthrough curve of a more adsorbed compound upon an adsorbent.

Referring to FIG. 2, an adsorption cycle of three gases 100, 102, 104 can be observed with gas 100 being least adsorbable, and gas 104 being most adsorbable. As a mixture of these product gases in introduced at the feed end 37 of the adsorber 12, initially gases 102, 104 are essentially completely adsorbed, with relatively pure gas 100 effluenting the adsorber 12 at withdrawal end 39.

Figure 3:
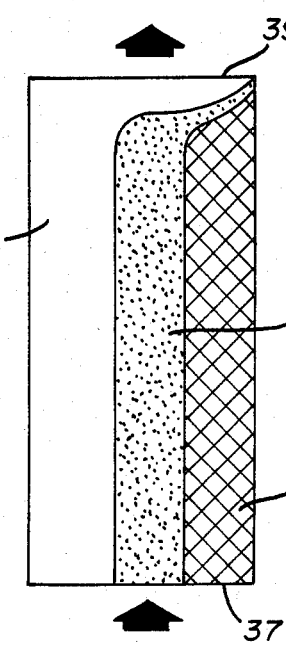
FIG. 3 is a diagrammatic view of an advancing breakthrough curve of a more adsorbed compound upon an adsorbent.

Referring to FIG. 3, the adsorbent has become substantially loaded wth the more adsorbed gases 102 and 104 and gas 102 has just commenced effluenting the adsorber 12 with gas 100. Depending upon the purity of gas 100, desired collection of relatively pure gas 100, the least adsorbable, is generally discontinued. FIG. 3 represents the onset of breakthrough of the gas 102.

Figure 4:
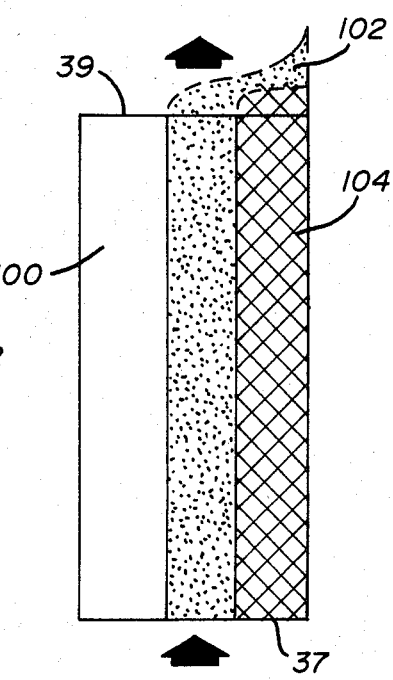
FIG. 4 is a diagrammatic view of an advancing breakthrough curve of a more adsorbed compound upon an adsorbent.

Referring to FIG. 4, the most adsorbable gas 104 has commenced effluenting the adsorber 12. At this juncture, effective separation of the feed gas by the adsorbent has ceased and the feed of mixed gaseous products 100, 102 and 104 at 37 is stopped, particularly as breakthrough of the gas 104 is completed.

Figure 5:
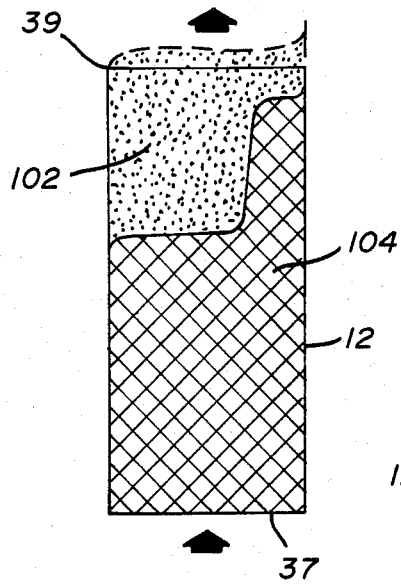
FIG. 5 is a diagrammatic view of an advancing rectification wave or a more adsorbed compound upon an adsorbent.
Figure 6:
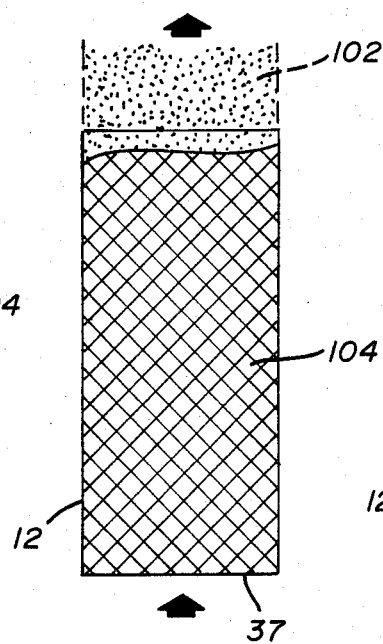
FIG. 6 is a diagrammatic view of an advancing rectification wave or a more adsorbed compound upon an adsorbent.
Figure 7:
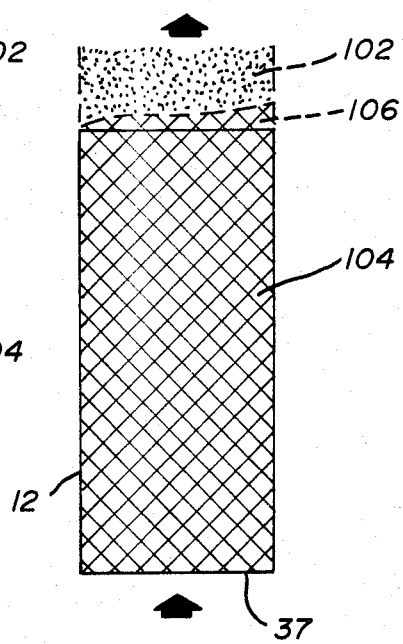
FIG. 7 is a diagrammatic view of an advancing rectification wave or a more adsorbed compound upon an adsorbent.

Referring to FIGS. 5, 6, 7 rectification is depicted while starting from the position as shown in FIG. 5. Rectifying agent, the most adsorbable gas 104, is introduced at the adsorber 12 feed end 37, and has begun effecting stratification of the gases into zones or layers of the relatively pure gases. In FIG. 6, the rectifying agent has displaced the gas 102 towards the withdrawal end 39 of the adsorber 12. Together with the gas 102, the rectification gas has also displaced the gas 100 from the adsorber enabling its recovery in high purity.

Referring to FIG. 6, continued introduction of the rectification agent has substantially completed stratification of the gases upon the adsorbent while displacing the gas 102 from the adsorber 12. Substantially, pure gas 102 can thereby be segregated for recovery.

Referring to FIG. 7, a zone 106 of intermixed gases 102, 104 can be discerned between the two relatively pure gases 102, 104. Such zones 106 can be recovered for subsequent separation upon effluenting the adsorber 12.

Following completion of rectification, the adsorbent is substantially loaded with rectification agent. This rectification agent is then stripped or desorbed from the adsorbent generally using a heat source. In this best embodiment, the valves 40 and 50 are opened and steam, present in header 24, is admitted to the adsorber 12. The steam drives rectifying agent from the adsorbent into header 34 from which it is recovered in substantially pure form. The analyzer 65 can be used to determine when sufficient steam has been introduced to effectuate desorption of the rectifying agent. The valves 40 and 50 are then closed, completing the desorption step.

In lieu of steam for desorption, hot air, hot gases, or any other suitable desorption media can be utilized. In an equally preferred alternate, the valves 40 and 50 can be arranged to introduce a hot fluid into heater coils or panels within the adsorber whereby the adsorbent may be heated without contacting the heating medium with the adsorbent. Using such materials as THERMINOL, a Monsanto Company heat transfer fluid, quite elevated adsorbent temperatures can be realized. Other suitable or conventional means for heating and/or desorbing the adsorbent, such as the use of a vacuum are contemplated as being within the purview of the present invention. Where hot fluid is introduced into internal adsorber coils, a further valve and piping (not shown) is required for removal of the hot fluid. Valve 50 continues to function to remove desorbed rectifying agent.

Following desorption, the adsorber is readied for a further adsorption cycle. For separations involving certain mixtures of products gases, simple introduction of the mixture or the least adsorbable component of the mixture into the adsorber can suffice to ready the adsorbent. More often, however, it is necessary to cool and perhaps condition the adsorbent.

Referring to FIG. 1, in one preferred mode the valves 40, 50 are opened to permit a readying agent such as a cooling fluid to flow between headers 26, 36 through the adsorbent. Often, this fluid is nitrogen, air, or some readily desorbed gas. In other equally preferred embodiments, the valve 40 gives cooling fluid access to coils or panels within the adsorber whereby cooling may be accomplished without contact between cooling medium and adsorbent. Where coils are used, a separate outlet (not shown) is necessary.

In a still further equally preferred embodiment, vacuum may be used for desorption, which thus eliminates cooling. The analyzer 67, while optional, can assist in identifying completion of this readying step. Often this analyzer is a temperature probe. Following completion of this readying step, the adsorber is prepared for a further adsorption.

In practice, four adsorbers 12, 14, 16, 18 are arranged in parallel flow configuraton. One adsorber 12 operates upon the adsorption step, while another 14 is being rectified, while another 16 is being desorbed, and a fourth 18 is being readied. When the most adsorbable gaseous product breaks through on the adsorber 12, the adsorber 12 is then rectified while the adsorber 14 is desorbed, the adsorber 16 is readied and the adsorber 18 commences adsorption.

The adsorbers are cycled through the steps in a continuous manner, thereby producing a semi-continuous stream of the various gaseous products while consuming a substantially continuous feed stream of the mixture of product gases. The advantages of maintaining a generally constant consumption of the mixture of feed gases is achieved while avoiding the disadvantage of circulating the adsorbent as necessary in moving bed adsorbers.

By varying the temperature of the feed mixture of product gases and its pressure, the relative quantities of the adsorbable gases actually adsorbed can be varied somewhat in well known methods.

Where introduction of the mixture of feed gases is utilized to prepare the adsorbent for further adsorption, depending upon gas flows, the adsorber size, relative adsorbabilities of the gases and other factors, the desorbing and readying steps may be combined so that only three adsorbers may be required for effecting the semi-continuous batch process of the instant invention. For such a combination of readying and desorbing steps to be practical, the adsorbent must be capable of being desorbed and readied before another becomes fully loaded with the gaseous mixture so as to trigger a breakthrough of the most adsorbable gas.

The following examples serve to further illustrate the invention:

EXAMPLE I

A vertical adsorber column was charged with BPL type activated carbon available from PPG Industries thereby establishing an adsorber bed. A feed mixture of product gases was introduced to the lower end of the adsorber, the mixture having a composition of 80 percent methane, 10 percent ethane, and 10 percent ethylene. The feed was introduced at a rate of 1000 cubic centimeters (cc) per minutes (min) per square centimeter ($cm^2$) of horizontal sectional area of the BPL adsorbent bed established within the adsorber.

Initially, gas effluented the adsorber at a rate of approximately 800 cc/min-$cm^2$, the effluenting gas being substantially pure methane. With time, ethylene and subsequently ethane began to break through into the gas stream effluenting the adsorber, until effluenting gas volume rose to approximately 1000 cc/min.-$cm^2$ and the composition of gas effluenting the adsorber approximated that of the feed. Feed was then discontinued, collection of substantially pure methane having been discontinued upon ethylene appearing in the effluent gas stream.

Ethane, the most adsorbent of the feed gases, was then flowed into the lower end of the adsorber at a flow rate approximately identical to that of the feed gas mixture, commencing rectification of the adsorber. Pure methane was collected until ethylene again appeared in the effluent. A mixture of ethylene and methane was then collected for recycling until substantially pure ethylene began emerging, whereupon, the substantially pure ethylene was collected until ethane again appeared in the effluent.

A mixture of ethylene and ethane was then collected for recycling until substantially pure ethane commenced effluenting the adsorber whereupon flow of the rectifying agent, ethane, was halted. Continuation of ethane flow until substantially pure ethane effluented the adsorber was necessary to insure retrieval of pure ethane from the adsorber upon desorption.

Steam was then introduced into the lower end of the adsorber, and ethane collected until the flow of ethane substantially ceased. Methane was then passed through the adsorber to provide cooling, after which the foregoing procedure was repeated. All work was conducted at 25° C. and approximately atmospheric pressure.

EXAMPLE II

Example I was repeated except that flow of the feed gas was discontinued when ethylene appeared in the effluent stream from the adsorber. Rectification and desorption proceeded substantially as in Example I.

While a preferred embodiment of the invention has been shown and described, it will be apparent that modifications may be made therein without departing from the spirit of the invention and having thus described my invention, what I claim is:

1. A process of separating several comingled gases of at least quasilinear properties from one another, which comprises passing said comingled gases at atmospheric pressure and room temperature as a feed stock through a preferential adsorbent in a static bed characterized by its ability to adsorb all of said comingled gases until all of said comingled gases are adsorbed and until the least adsorbable gas of said comingled gases emerges from said adsorbent, displacing said least adsorbable gas from said adsorbent by recycling said feed stock and collecting said least adsorbable gas; cycling the most adsorbable of said remaining comingled gases through said adsorbent until said most adsorbable gas emerges from said adsorbent, displacing said next higher adsorbable gas, collecting said next higher adsorbable displaced gas, cycling said next most adsorbable gas through said adsorbent until a still higher adsorbable gas of said comingled gases emerges from said adsorber; collecting said displaced gas and continuing said cycling of said most adsorbable gas until all of said comingled gases are separated from one another and collected and finally purging said most adsorbable gas from the adsorbent.

2. The process of separating several comingled gases of at least quasilinear properties set forth in claim 1 and wherein the most adsorbable gas is passed through said adsorbent until said most adsorbable gas purges said adsorbent; displacing said most adsorbable gas from said adsorbent and collecting said most adsorbable gas.

3. The process of claim 1 including the step of during the flow of the most adsorbable gas segregating in order from less adsorbable to more adsorbable as much as $n-1$ gases sequentially effluenting the adsorber.

4. A process of separating several comingled gases of at least quasilinear properties from one another in an adsorber containing a quasilinear preferential adsorbent, the gases ranging from a least adsorbable to a most adsorbable upon said adsorbent, comprising contacting the mixture of gases with the preferential adsorbent by flowing the mixture through the adsorber at atmospheric pressure and room temperature; collecting the least adsorbable gas flowing from the adsorber until all of said gases are adsorbed and until a desirable more adsorbable gas appears in effluent from the adsorber; discontinuing flow of the mixture of gases into the adsorber; flowing a most adsorbable of said comingled gases into the adsorber, collecting gas effluenting the adsorber until the next most adsorbable gas commences effluenting the adsorger; discontinuing flow of the most adsorbable gas into the adsorber; desorbing the adsorber while collecting the most adsorbable gas effluenting the adsorber during desorption; and readying the adsorber for further adsorption of the mixture of gases, repeating said process until all of said comingled gases are separated and collected and finally purging the most adsorbable gas from the adsorbent.

5. The process of any of claims 1 or 3 the adsorbent being activated carbon.

* * * * *